(12) United States Patent
Lindsay

(10) Patent No.: US 11,498,375 B2
(45) Date of Patent: Nov. 15, 2022

(54) TRAILER HITCH SYSTEM AND DESIGNS

(71) Applicant: ExoTek Trailers, Inc., Cave Creek, AZ (US)

(72) Inventor: Howard Alvin Lindsay, Cave Creek, AZ (US)

(73) Assignee: ExoTek Trailers, Inc., Cave Creek, AZ (US)

( * ) Notice: Subject to any disclaimer, the term of this patent is extended or adjusted under 35 U.S.C. 154(b) by 183 days.

(21) Appl. No.: 16/941,321

(22) Filed: Jul. 28, 2020

(65) Prior Publication Data

US 2021/0031577 A1 Feb. 4, 2021

Related U.S. Application Data

(60) Provisional application No. 62/922,159, filed on Jul. 29, 2019.

(51) Int. Cl.
| | |
|---|---|
| *B60D 1/48* | (2006.01) |
| *B60D 1/24* | (2006.01) |
| *B62D 53/08* | (2006.01) |
| *B60D 1/06* | (2006.01) |
| *B60D 1/01* | (2006.01) |
| *B60D 1/14* | (2006.01) |

(52) U.S. Cl.
CPC ............ *B60D 1/488* (2013.01); *B60D 1/015* (2013.01); *B60D 1/06* (2013.01); *B60D 1/143* (2013.01); *B60D 1/247* (2013.01); *B62D 53/0828* (2013.01)

(58) Field of Classification Search
CPC ........ B60D 1/015; B60D 1/143; B60D 1/247; B60D 1/488

USPC .......................................................... 280/496
See application file for complete search history.

(56) References Cited

U.S. PATENT DOCUMENTS

| 3,383,119 | A | | 5/1968 | Carroll | |
|---|---|---|---|---|---|
| 3,692,332 | A | | 9/1972 | Pappatheodoru | |
| 3,756,624 | A | * | 9/1973 | Taylor | B60D 1/488 |
| | | | | | 280/901 |
| 3,770,297 | A | * | 11/1973 | Quick | B60P 3/34 |
| | | | | | 280/491.4 |
| 3,870,341 | A | * | 3/1975 | Younger | B60S 9/02 |
| | | | | | 280/901 |

(Continued)

FOREIGN PATENT DOCUMENTS

| EP | 0111855 A2 | * | 6/1984 |
|---|---|---|---|
| EP | 0876929 A1 | * | 11/1998 |

(Continued)

*Primary Examiner* — Kevin Hurley
*Assistant Examiner* — Hosam Shabara
(74) *Attorney, Agent, or Firm* — Law Offices of Damon L. Boyd, PLLC

(57) ABSTRACT

A trailer hitch system for a vehicle such as a car, truck, or SUV, and trailer comprising an overcab portion substantially parallel to a roof of the truck. The overcab portion comprises a roof connector located generally equidistant from either lateral side of the roof and is aligned with a door pillar, and a hitch for connecting the trailer. The overcab portion further comprises a forward frame portion extending from the overcab portion with a forward frame connector and a rearward frame portion extending from the overcab portion with a rearward frame connector, both of which connect to the frame of the vehicle.

17 Claims, 6 Drawing Sheets

(56) References Cited

U.S. PATENT DOCUMENTS

| | | | | |
|---|---|---|---|---|
| 3,887,220 A | * | 6/1975 | Hall | B62D 53/0828 |
| | | | | 280/901 |
| 5,348,329 A | * | 9/1994 | Morin | B60D 1/065 |
| | | | | 280/496 |
| 2008/0238138 A1 | * | 10/2008 | Vallee | B60P 3/32 |
| | | | | 296/167 |

FOREIGN PATENT DOCUMENTS

| | | | | |
|---|---|---|---|---|
| GB | 2093783 A | * | 9/1982 | B60D 1/06 |
| WO | WO 8601780 A1 | * | 3/1986 | |

* cited by examiner

TRAILER HITCH SYSTEM AND DESIGNS

CROSS REFERENCE TO RELATED APPLICATIONS

This Patent Applications is related to and claims priority under 35 U.S.C. § 119(e) to U.S. Provisional Patent Application No. 62/922,159, entitled "Hyhitch Trailer Design and Related Innovations," filed Jul. 29, 2019; which is hereby incorporated by reference in its entirety for all purposes.

BACKGROUND

Field

The present disclosure relates to improved trailer hitch systems and designs.

Background

There are many examples of mechanisms for attaching towable trailers to other vehicles. These include recreational vehicle trailers (also called an "RV") for providing living quarters for camping and traveling, horse trailers, boat trailers, car, motorcycle, and ATV trailers, and work, cargo, and utility trailers, among many others. The vehicles used to pull these trailers have evolved over time, as have the corresponding trailer designs and corresponding connection mechanisms (also called the "hitch").

Pulling trailers behind powered vehicles has occurred since the inception of the automobile. By the 1950's, it was common to use regular passenger cars for pulling trailers. Because the cars had power and weight carrying limitations, the trailers were typically light weight designs and the typical manner in which they were connected to the car was known as a traditional "bumper mount." Over time, the modern pick-up truck evolved as the primary powered vehicle for pulling trailers and the conventional "bumper mount" is the attachment technique that is most common.

As trailers evolved and became larger and heavier, attachment methods also evolved, as did the type of trucks that pull them. In this regard, a system commonly referred to as a "5th wheel" attachment hitch has become the current state of the art for these larger and/or heavier trailers with widespread use with both light duty trailers and with heavy duty commercial applications (e.g., semi-trucks).

While there are many benefits of a 5th wheel system over a conventional bumper mounted system, most of them are tied to the ability to move the trailers connection pin (and therefore its weight) forward over the truck's rear axle. This improves the weight carrying capability of the truck and the dynamic stability of the "entire system" (i.e., the vehicle and trailer, together) by helping balance the trailer's tongue (or pin) weight over all truck tires (typically, four to six tires) and is the primary reason for the improvement of the 5th wheel hitch designs in trailering capability and stability over bumper pull designs.

Another benefit of 5th wheel hitch systems is that the hitch's higher vertical location (mounted in the bed portion of a truck) creates a "bi-level" trailer design that offers extra interior space in the area over the bed of the truck. As such, modern 5th wheel trailers have evolved to heights over thirteen feet from the ground with the trailer section over the truck bed commonly used for sleeping or living quarters. This movement of the hitch position up has contributed to the performance of 5th wheel systems.

However, this type of 5th wheel hitch can only be used for trucks that have an open truck bed and access to connect the hitch system to the bed and/or frame of the truck. Passenger cars and sport utility vehicles (SUV's) cannot use a 5th wheel type hitch design and, as such, are limited to conventional bumper mounted hitch systems with inherent limitations of weight distribution and trailering stability resulting in passenger cars and SUV's being limited to towing small, lightweight trailers.

A conventional bumper mount system, used in conjunction with a truck, has some distinct advantages and disadvantages. The disadvantages have been described above; however, a significant advantage is keeping the bed of the truck available for other uses while the trailer is connected to the bumper. Most 5th wheel hitch mounts dominate the trucks bed making it unusable for other things.

In virtually every conventional bumper pull or 5th wheel hitch system currently used, the hitch is connected directly (or indirectly) to the structural frame of the towing vehicle. This is to allow the vehicle to effectively support the static and dynamic loads imparted on the vehicle by the trailer during use and operation. This requirement is why some roof mounted systems such as those disclosed in U.S. Pat. Nos. 3,383,119 and 3,692,332 failed. The dynamic loads that the trailer imparted on the roof of the car (during use) simply exceeded the structural integrity of the roof of a passenger car. As such, the entire system failed as the roof section buckled under the dynamic loads and consumers lost faith in the safety of the roof mounted hitch system.

Accordingly, there is a need for improved trailer hitch systems and designs which address the above-noted deficiencies of the prior art.

SUMMARY

In general, the present disclosure provides a trailer hitch system for a vehicle such as a car, truck, or SUV, and trailer comprising an overcab portion substantially parallel to a roof of the truck. The overcab portion comprises a roof connector located generally equidistant from either lateral side of the roof and is aligned with a door pillar, and a hitch for connecting the trailer. The overcab portion further comprises a forward frame portion extending from the overcab portion with a forward frame connector and a rearward frame portion extending from the overcab portion with a rearward frame connector, both of which connect to the frame of the vehicle.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein.

DETAILED DESCRIPTION OF THE ILLUSTRATED EMBODIMENTS

Figure 1A:
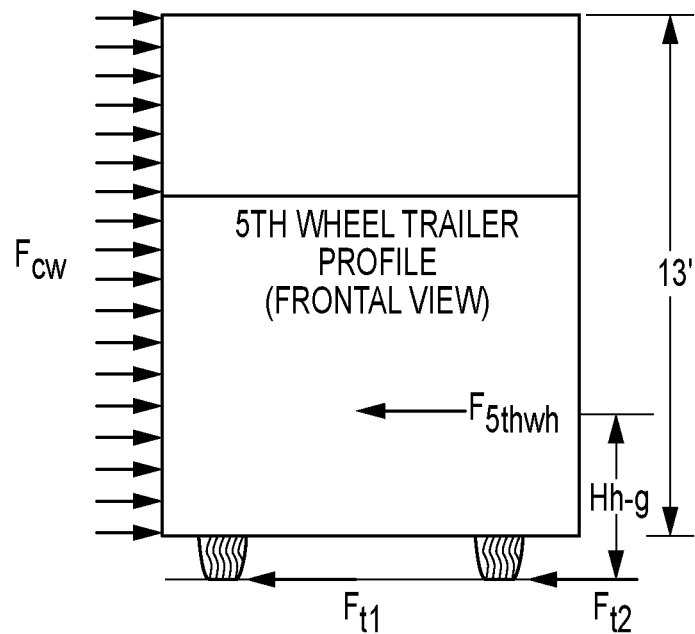
FIG. 1A is a frontal view of a free body diagram of a prior art 5th wheel trailer a bumper pull trailer.

Persons skilled in the art will readily appreciate that various aspects of the present disclosure can be realized by any number of designs and systems configured to perform the intended functions. Stated differently, other methods and systems can be incorporated herein to perform the intended functions. It should also be noted that the accompanying drawing figures referred to herein are not all drawn to scale but may be exaggerated to illustrate various aspects of the present disclosure, and in that regard, the drawing figures should not be construed as limiting. Finally, although the present disclosure can be described in connection with various principles and beliefs, the present disclosure should not be bound by theory.

In general, the present disclosure provides an improved trailer hitch system for vehicles towing trailers that have applicability to everything from cars and light-duty trucks and SUV's to heavy-duty semi-trucks and multi-axle trailers. More specifically, hitch systems in accordance with the present disclosure move the hitch position forward from and higher than the rear bumper of the tow vehicle, thus improving the load carrying capability of the entire vehicle/trailer system by distributing more weight towards the front tires of the tow vehicle, which in turn, improves dynamic stability while towing.

Figure 1B:
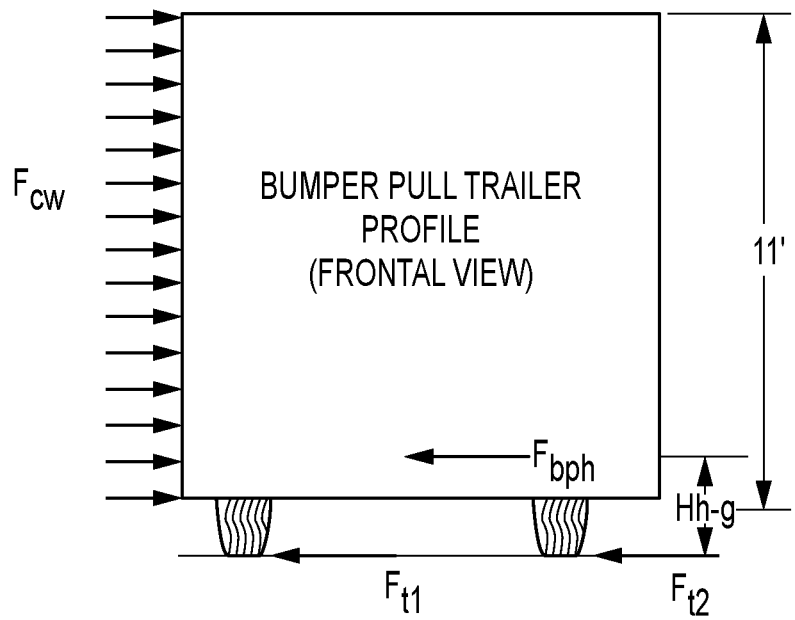
FIG. 1B is a frontal view of a free body diagram of a prior art bumper pull trailer.

This is in part due to the fact that during use in cross winds, the side forces acting on a trailer can be described in a free body diagrams such as illustrated in FIGS. 1A and 1B. FIG. 1A illustrates a 5th wheel trailer and FIG. 1B illustrates a bumper pull trailer. Both are frontal views that show the resulting forces acting on them during a cross wind. In both diagrams, $F_{cw}$ is a distributed side force caused by wind and $F_{t1}$ and $F_{t2}$ are the reactive forces of the trailer tires. For the 5th wheel, $F_{5thwh}$ is the reactive force of the 5th wheel vehicle hitch and $F_{bph}$ is the reactive force of the bumper pull vehicle. In each case, the combined reactive forces must counterbalance the collective wind-force or the trailers may be blown off-course.

The height of the hitch off the ground is shown as $H_{h-g}$ and it is the dimension that is critical to trailer stability when a trailer experiences the type of side loading during cross winds. As shown in FIGS. 1A and 1B, the $5^{th}$ wheel hitch design is much higher than bumper pull designs and as such, they help withstand wind loads more effectively and with more stability. This is why 5th wheel trailer designs can be made taller, such as about 13 feet as shown in FIG. 1A compared to about 11 feet as shown in FIG. 1B, which is more typical for bumper pull trailer designs.

While the benefit of moving the hitch position up from ground level is less obvious that by moving the hitch position both up and forward at the same time, towing stability and resulting vehicle dynamics are improved over prior art 5th wheel and bumper mounted hitch locations.

Figure 2:
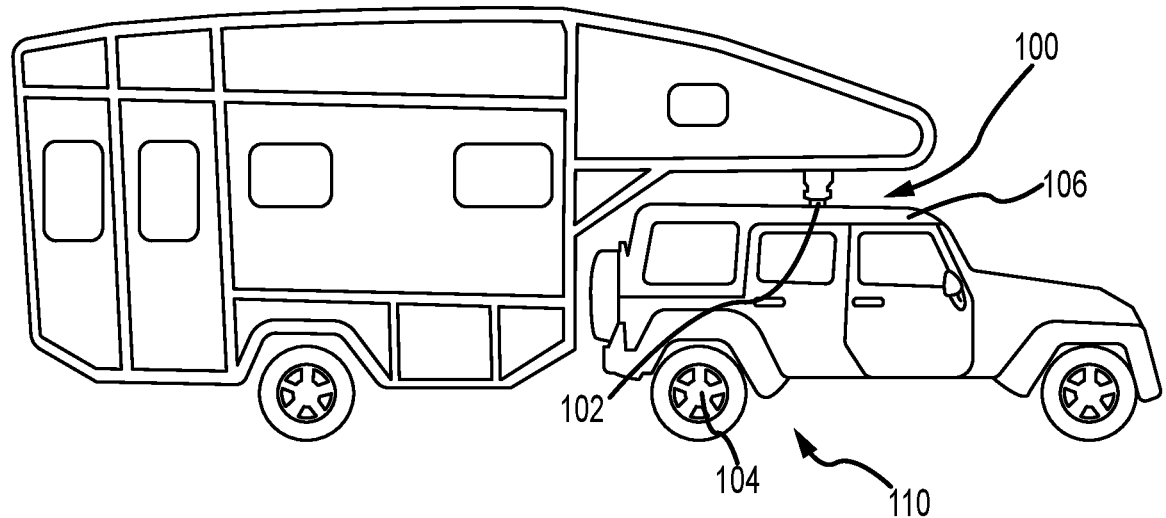
FIG. 2 is side view of an SUV and trailer connected via a hitch system in accordance with the present disclosure.
Figure 3:
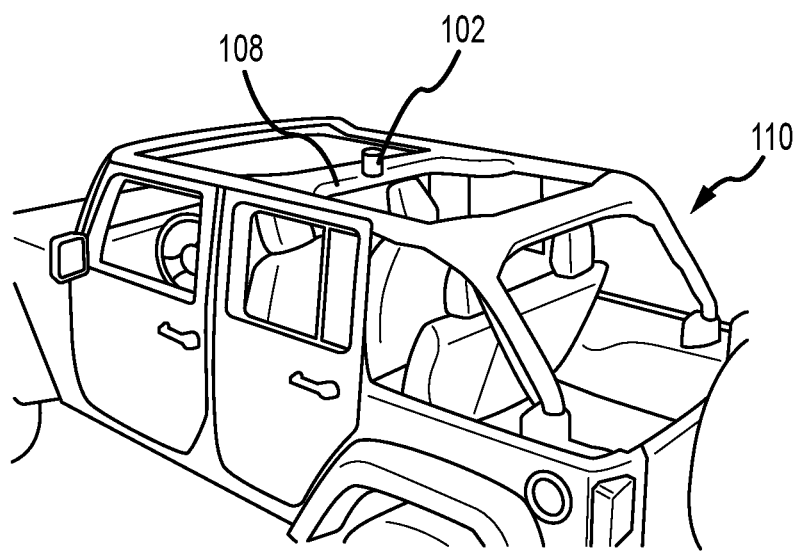
FIG. 3 is perspective view of an SUV and roll bar used with a hitch system in accordance with the present disclosure.

The above being noted, in accordance with various aspects of the present disclosure and with reference to FIGS. 2-3, an example of a hitch system is illustrated. The hitch mechanism itself may be a conventional ball and receptacle hitch of any conventional or unconventional size, now known or as yet unknown and may be secured to the vehicles contemplated herein by structure disclosed herein, as well as other conventional or unconventional mechanisms.

In this embodiment, the hitch system 100 is attached to a Jeep Wrangler style vehicle 110 and a trailer 120 configured for attachment to the hitch system 100. The hitch system 100 moves a hitch mounting location 102 (or "pin position") about 30 inches in front of the rear axle 104 of the vehicle 110, while a conventional bumper hitch mounting location for the vehicle 110 would be about 30 inches behind the rear axle 104. Additionally, in the embodiment illustrated in FIG. 2, the hitch mounting location 102 is also located more than 48 inches higher than the conventional bumper hitch location. One skilled in the art will appreciate however that hitch mounting location 102 may vary both forward and backward from the rear axle 104 and up and down from a conventional bumper hitch location, depending on the particular vehicles used, as well as the trailer used.

Thus, by moving the hitch mounting location 102 in front of the rear axle 104 of the vehicle 110 and above the conventional bumper hitch location, there is an improved distribution of the pin weight of the trailer 120 more evenly over all tires of the vehicle 110, improving the vehicle/trailer system capacity and stability.

In accordance with various aspects of the present disclosure and with reference to FIG. 3, the hitch system 100 comprises a hitch and a hitch connector configured for attachment to a roll bar of the vehicle 110 equidistant from either lateral side of a roof of the vehicle. The hitch system 100 is mounted via the hitch connector through a removable top 106 (which may be soft or hard) of the vehicle 110 and secured directly to the vehicle 110 roll bar system 108, which in turn is securely mounted to the vehicle frame. This rigid connection to the vehicle frame vis a vis the roll bar system 108 is a significant difference from the prior art attachment to a vehicle roof, bumper or 5th wheel.

Figure 4:
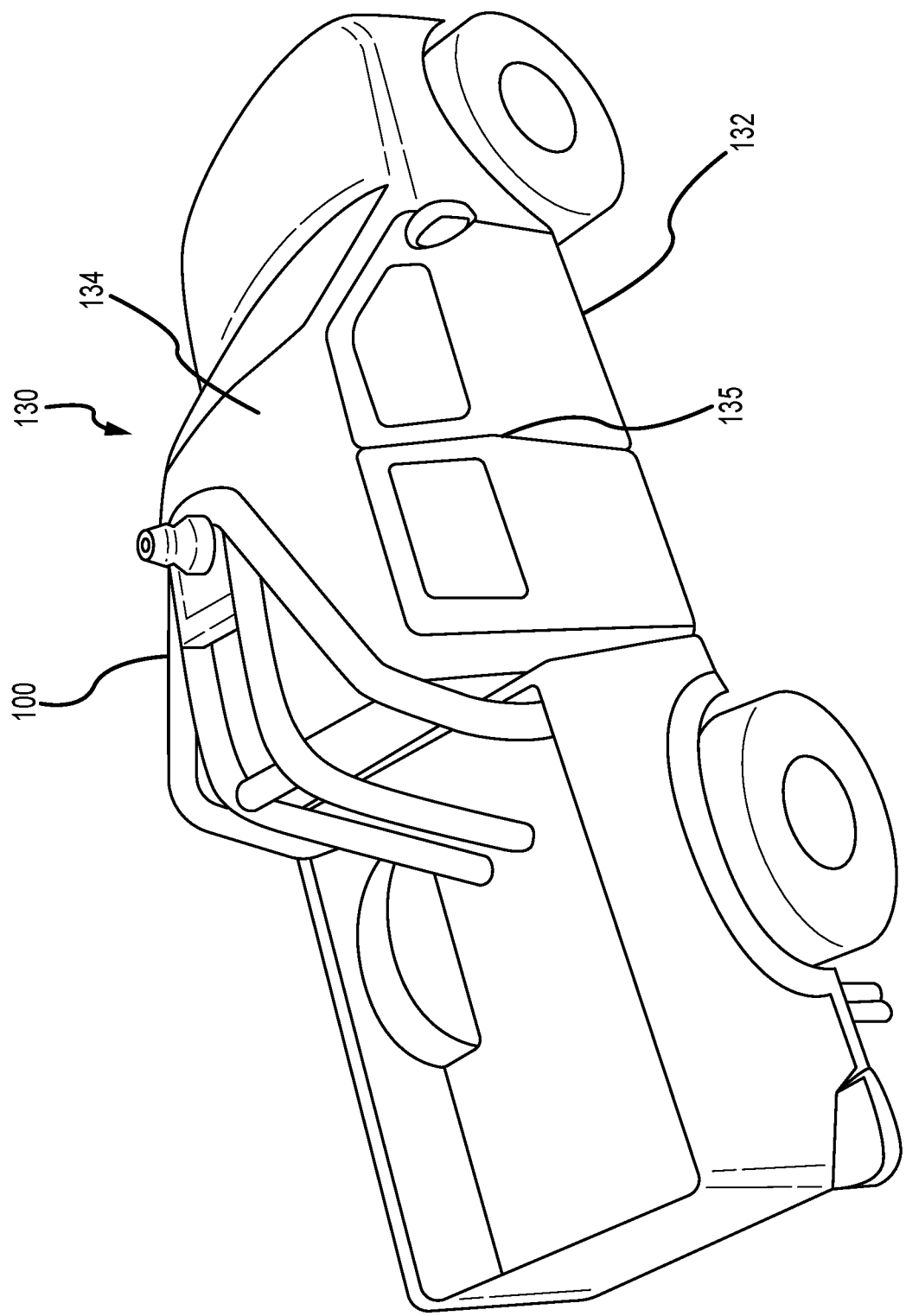
FIG. 4 is perspective view of a truck with a hitch system in accordance with the present disclosure.

A hitch system 100 in accordance with the present disclosure also allows the ability for any vehicle/trailer system where the connection to the tow vehicle can be made directly (or indirectly) to the vehicle frame, including SUV's like the Jeep Wrangler shown as well as conventional pickup trucks. For example, in accordance with an alternative aspect of the present disclosure and with reference now to FIGS. 4 and 5, an alternative example of a hitch system 100 is illustrated. In this embodiment, the hitch system 100 is attached to a conventional, open bed pick-up truck style vehicle 130. Modern pick-up trucks 130 have evolved to include extended cab designs that feature four doors and an extended roof section. A typical truck design 130 is illustrated in FIG. 4. As a result of this evolution, the cab 132 of the truck 130 is typically partitioned by a door pillar 135 (often called a B-pillar) that provides a rigid load path from the roof 134 of the truck 130 to the frame (not shown) in that approximate location. The door pillar 135 location is generally near the center of the wheelbase of the truck 130 and, as such, is an ideal location for the hitch mounting location 102.

Those skilled in the art will appreciate that with a typical 5th wheel hitch attachment, the location of the hitch is usually no more than about 12 inches in front of the rear axle of the truck to which it is mounted, as moving the hitch any more forward creates interference issues between the trailer, particularly the bi-level section found in the area over the bed of the truck, with the cab of the truck.

In contrast, hitch systems 100 in accordance with the present disclosure eliminate this interference issue as it locates the bi-level section of the trailer above the cab 132 and moves the hitch location 102 more than 12 inches in front of the rear axle 104, thereby improving the towing dynamics and load carrying capabilities of the truck 130.

Additionally, in accordance with another aspect in accordance with the present disclosure, the hitch system 100, when used with a pickup truck 130, the ability to retain more of the bed 136 of the truck 130 is preserved when the hitch system 100 is in place. For example, with reference to FIGS. 4 and 5, the hitch system 100 is configured to connect to the frame of the truck 130 through the front portion of the bed 136, extending up and over the cab 132 where it may be secured proximate the door pillar 135 allowing the hitch location 102 to move forward to help distribute the trailer pin-load over all tires of the truck 130.

Figure 5:
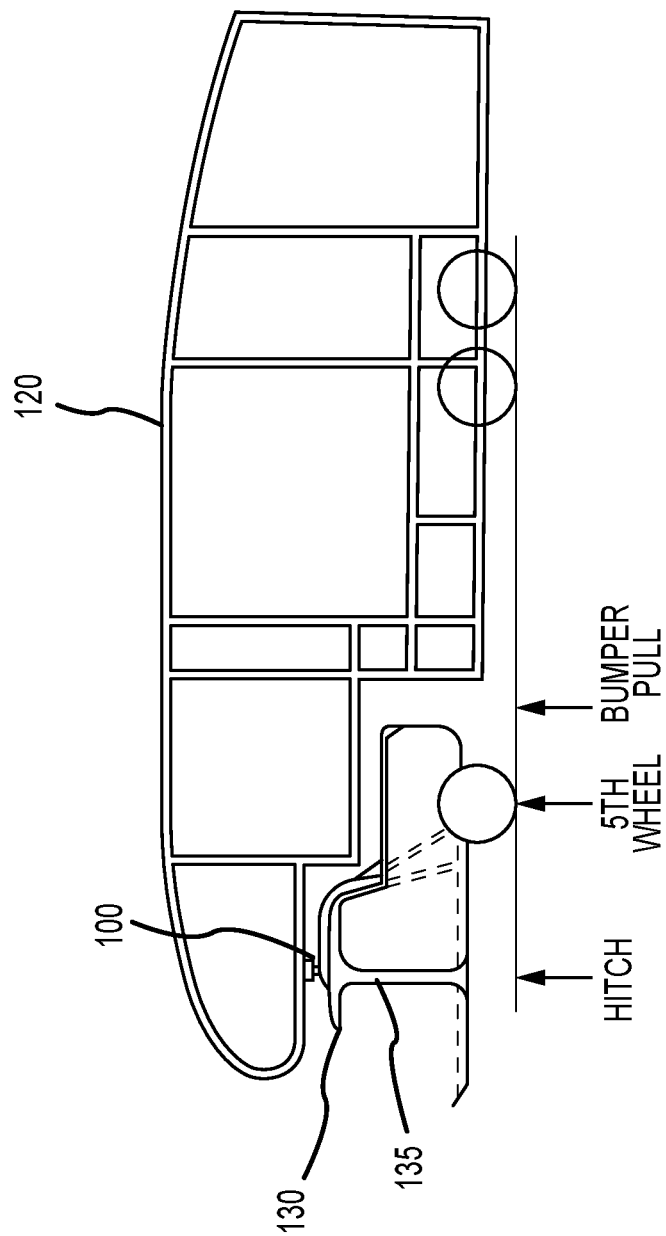
FIG. 5 is side view of a truck and trailer connected via a hitch system in accordance with the present disclosure.

In accordance with various aspects of the present disclosure and with reference to FIG. 5 illustrating a truck 130 and trailer 120 connected using a hitch system 100 as contemplated herein, trailers 120 used in connection with hitch system 100 are of comparable height to conventional bumper and/or 5$^{th}$ wheel trailers and are configured to work with a variety of vehicles. However, the higher and more forward hitch location 102 will make the new vehicle/trailer system much more stable in cross wind situations.

Figure 6A:
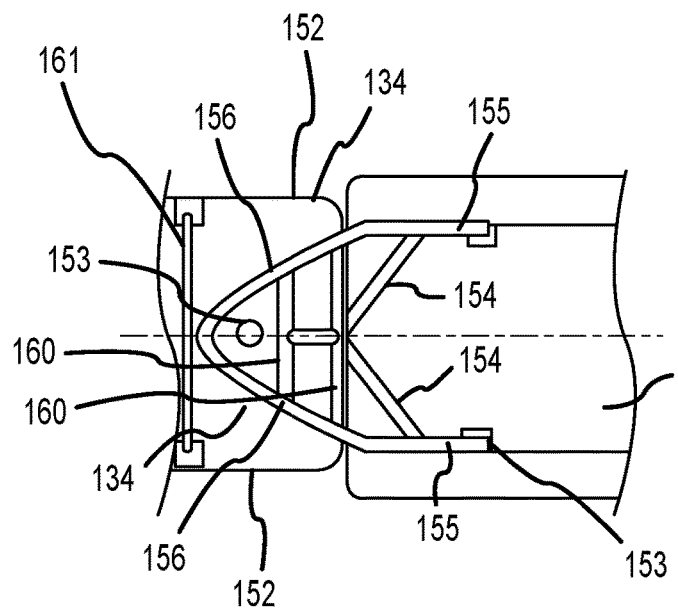
FIG. 6A is top view of a hitch system in accordance with the present disclosure.
Figure 6B:
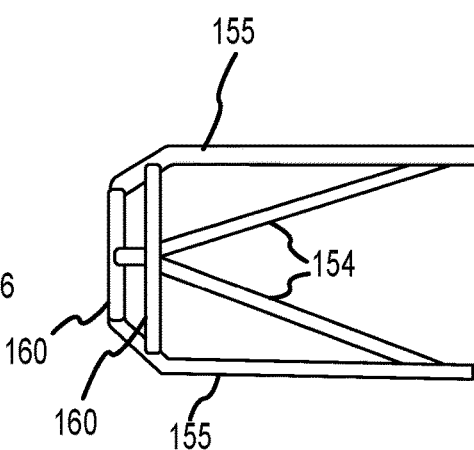
FIG. 6B is rear view of a hitch system in accordance with the present disclosure.
Figure 6C:
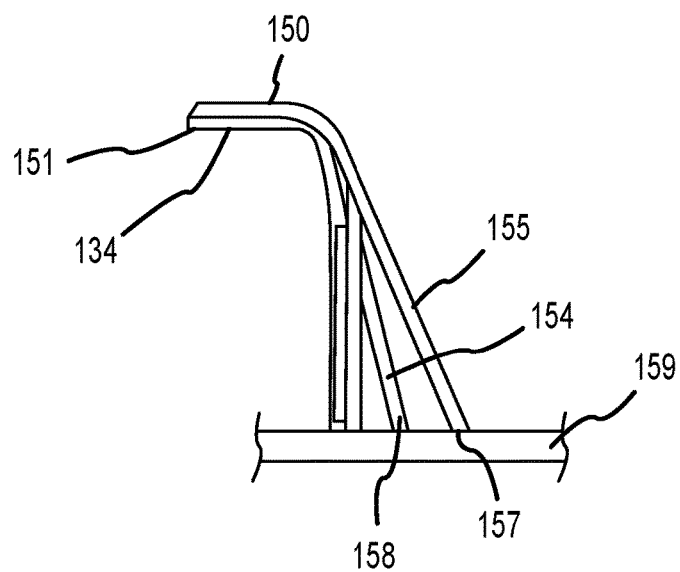
FIG. 6C is side view of a hitch system in accordance with the present disclosure.

With reference now to FIGS. 6A-6C, close-up views of the hitch system 100 illustrated in FIGS. 4 and 5 are shown. More specifically, hitch system 100 comprises a frame comprised of a plurality of interconnected components. In the presently described embodiment, the components may be hollow steel tubes, though other suitably strong materials such as aluminum, carbon fiber or the like may be substituted. Similarly, the components need not be tubular but rather, may be solid.

As illustrated in FIGS. 6A-6C, the hitch system 100 comprises an overcab portion 150 substantially parallel to the roof 134 of the truck 130. In accordance with the present disclosure, the overcab portion 150 comprises a roof connector 151 located approximately equidistant from either lateral side 152 of the roof 134 and is aligned with the door pillar 135. Attached to the roof connector 151 is a hitch 153 for connecting the trailer 120. With continued reference to FIGS. 6A-6C, a rearward frame portion 155 extends from the overcab portion 150.

In the presently described embodiment, there are two rearward frame portions 155 extending from the overcab portion 150 towards the bed of the truck and the frame underneath. The two rearward frame portions 155 comprise at least two horizontal portions 156 that come together at a point culminating proximate the hitch 153. Additionally, in some embodiments, a rear portion of the overcab portion 150 comprises the at least two rearward frame portions 155. At the lower end of the rearward frame portions 155 are rearward frame connectors 157 for connecting the rearward frame portions 155 to a frame 159 of the truck 130.

In the presently described embodiment, there are two rearward frame portions 155 extending from the overcab portion 150 towards the bed of the truck 130 and the frame 159 underneath. At the lower end of the forward frame portions 154 are forward frame connectors 158 for connecting the forward frame portions 154 to the frame 159 of the truck 130.

In the presently described embodiment, the forward frame portions 154 pass through the bed 136 of the truck 130 and connect to the frame 159 of the truck closer to the cab 132 and the rearward frame portions 155 pass through the bed 136 of the truck 130 and connect to the frame 159 behind the forward frame portions 154. However, in alternative embodiments, the rearward frame portions 155 pass through the bed 136 of the truck 130 and connect to the frame 159 of the truck closer to the cab 132 and the forward frame portions 154 pass through the bed 136 of the truck 130 and connect to the frame 159 behind the rearward frame portions 155. In still other embodiments, the forward frame portions 154 and the rearward frame portions 155 may pass through the bed 136 of the truck 130 and connect to the frame 159 the same distance from the cab 132.

In accordance with various aspects of the present disclosure, the hitch system 100 comprises at least one lateral support portion 160 between the forward frame portions 154 and/or the rearward frame portions 155. In some embodiments, the forward frame portions 154 extend from the at least one lateral support portion 160 to the frame 159. In various alternative embodiments, the hitch system 100 may further comprise an optional roof support frame 161 extending from one lateral side of the truck 130 to the other to further react the vertical pinloads into the pillar 135 and thus, to the frame 159 of the truck 130.

In accordance with various aspects of the present disclosure, the hitch system 100 may comprises an overcab portion substantially parallel to a roof of the truck, wherein the overcab portion comprises a roof support frame 161 extending from one lateral side of the truck to the other and aligned with and connected to a door pillar 135, with a hitch 153 connected to the roof support frame 161. A rearward frame portion 155 with a rearward frame connector extends from the overcab portion. In accordance with various aspects of the present disclosure, the rearward frame portion 155 passes through the bed 136 of the truck 130 and connects to the frame 159.

Figure 7:
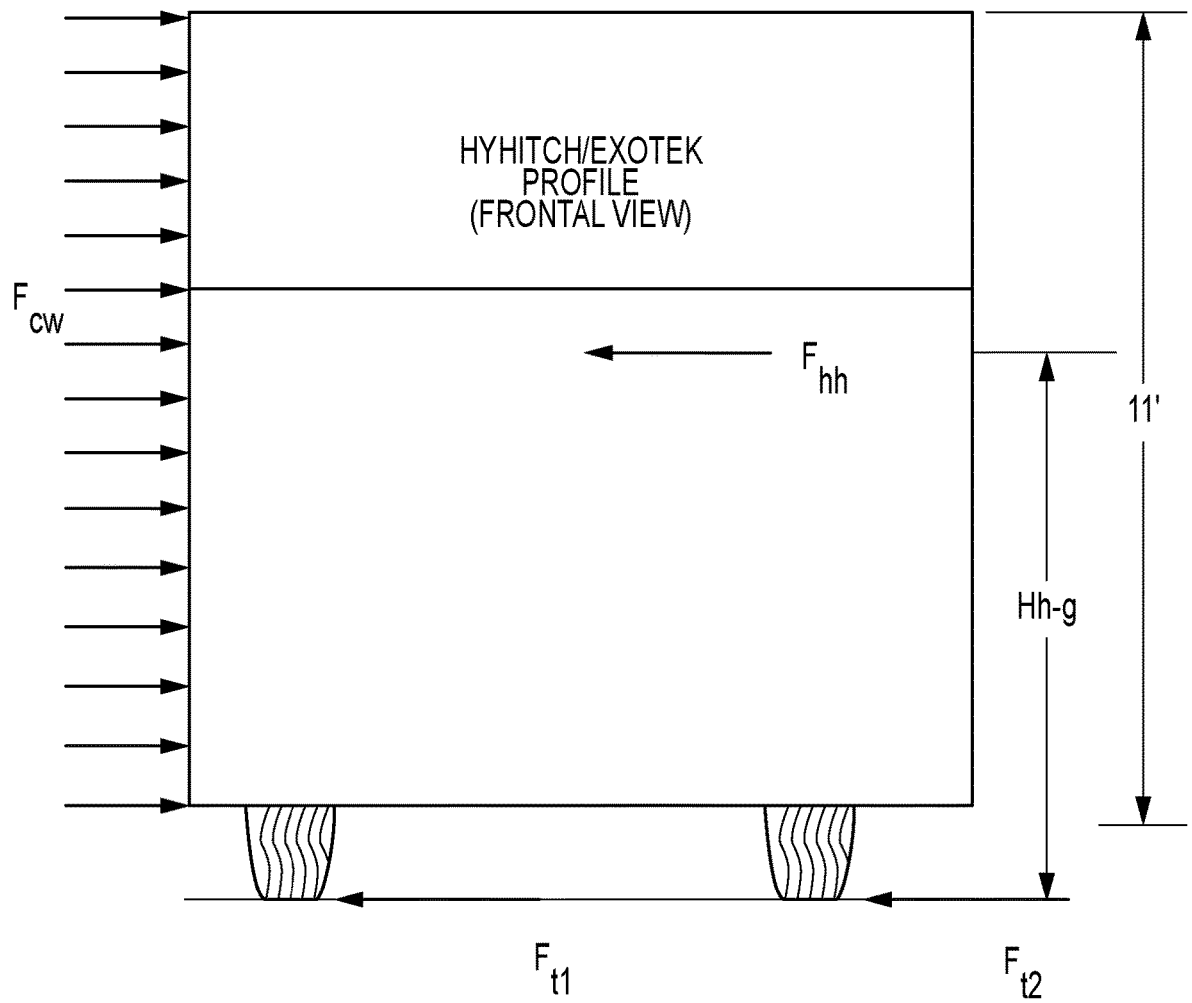
FIG. 7 is a frontal view of a free body diagram of a trailer using a hitch system in accordance with the present disclosure.

With reference to the free body diagram shown in FIG. 7, as shown in the free body diagrams of FIGS. 1A and 1B, $F_{cw}$ is the distributed side force caused by the wind and $F_{t1}$ and $F_{t2}$ are the reactive forces of the trailer 120 tires. With respect to the hitch system 100 used in FIG. 7, $F_{hh}$ is the reactive force of the vehicle hitch and, with reference back to FIG. 1B, $F_{bph}$ is the reactive force of the bumper pull vehicle. In each case, the combined reactive forces counterbalance the collective wind-force or the trailers will be blown off-course.

Because the height of the hitch location 102 is more than 48 inches higher than a conventional bumper mounted hitch position, and as noted in the prior 5th wheel (FIG. 1A) to bumper pull (FIG. 1B) comparison, this dimension significantly improves trailer stability during cross-wind situations. A higher location is more efficient at reacting the distributed wind loads on the side of the trailer.

Moreover, hitch location 102 of the disclosed hitch system 100 is also higher than 5$^{th}$ wheel hitch designs. This hitch location, with over 60 inches of forward movement on a Jeep-style vehicle, creates a new vehicle/trailer system that will be the most stable vehicle/trailer system on the market.

In accordance with various additional aspects of the present disclosure, hitch systems may include an energy-absorbing telescoping hitch to operates as a load limiter absorbing the sharp load spikes that are common while driving, particularly while off-road driving. This also improves ride quality during off-road use. The telescoping hitch may comprise an internal air bag system that can be operated during use to alter the ride height of the hitch and trailer system, allowing the driver to increase the clearance between the tow vehicle and the trailer. Less clearance is required for highway use so the driver can minimize air resistance and maximize fuel economy, while a city mode may increase the tow vehicle-trailer clearance by (e.g., 3-5 inches) to limit vehicle-trailer interference during moderate dips and road transition. Another position could raise the hitch another 3-5 inches to provide even more clearance for maneuvering over off-road obstacles and/or more challenging road conditions.

In accordance with various additional aspects of the present disclosure, new designs and fabrication of the structural elements of the trailer frame and sub-structures are provided. For example, trailers contemplated herein may comprise a true aluminum space frame that includes internal walls, roof and floor beams. A truss arrangement carries the dynamic loads to the space frame structure of the trailer. The result is a vehicle/hitch load transferred to the trailer frame at a much higher location than conventional bumper pull or 5th wheel trailers. This design may be created that is stiffer and lighter than conventional steel frames.

In accordance with another aspect of the present disclosure, desirable and beneficial aesthetics of the trailer may be realized. To that end, many of the beam elements of the structure will be designed to protrude beyond the exterior surfaces of the trailer, so they will remain visible. This approach positions the primary structural beam elements in a more efficient position than the floor level "ladder type" frames used in conventional trailer designs. These conventional ladder frames derive the majority of their stiffness and strength from the main frame rails located at the bottom (or below the floor) of the trailer frame.

The frames described herein move the structural beam members throughout the entire frame, even all the way to the very top. This is why the frames are more structurally efficient than conventional ladder frames because moving beams to the outside creates a much higher moment-of-inertia for the entire frame. The frames also communicate an improved visual indication of strength and stability. The tube sections that remain visible beyond the exterior walls will look like the roll bars commonly used in high-end off-road vehicles, communicating safety, stability and improved strength. The frames can be painted in high contrast colors to help accentuate their presence.

Welds used to connect the "visible" aluminum beam elements in the frames can be done with a tungsten-inert-gas (TIG) welding method, which produces a distinctive dime-on-dime pattern that functions a quality indicator of the trailer.

Additionally, many trailers that commonly referred to as "toy haulers" incorporate a rear door that doubles as a ramp to help load motorcycles, ATVs and such into the trailer. These ramp doors also function as floor sections to create outdoor patios when the door is down and the trailer is parked. This helps extend the "living space," opening up more room in the back of the trailer. This patio floor function is created when the door is open (or in the down position); however, when the door is up (or closed), the rear section of the trailer can take on a cave like feel as the ramp doors never have windows. This limits the natural light that can get into that portion of the trailer.

Thus, in accordance with various additional aspects of the present disclosure, trailer design disclosed herein may incorporate functioning windows into the rear ramp door, including a built-in grate and/or shutter system that protects the window opening(s) when the ramp door is being used as a ramp or as a floor in an outdoor patio mode. When the ramp door is up (or closed) the grates or shutters can then be opened to expose the windows and allow light to enter the rear of the trailer.

In accordance with various additional aspects of the present disclosure, the ramp door design may include a small raised "lip" around the perimeter of the ramp/patio door to create a small "floor-railing" designed to keep chairs from sliding off the edge. The surface of the patio is typically about 2-3 feet above grade when the patio function is in use. With a small area (e.g., about 7×7 feet), space is limited and when table and chair are used, it is possible that an inadvertent slide of a chair could allow a leg to slip over the patio edge causing a potentially dangerous fall. Thus, a small (e.g., 0.5 inches) raised lip would help stop a chair from sliding off the ramp door. The raised lip can also be incorporated into the structure of the ramp door increasing the rigidity of the door/floor.

In accordance with various additional aspects of the present disclosure, the trailer design can maximize the amount of time a user can function in an off-grid situation. For example, a typical limiting issue is the amount of fresh water a trailer can hold. It is not uncommon for small trailers (like the Jeep version shown on page-6) to carry only 20 gallons of fresh water. A typical RV trailer also contains "grey" water (which is water that has already been used for cleaning) and "black water" (which is water that has flowed out from the toilet and is therefore mixed with human waste) tanks.

Thus, in accordance with the present disclosure, redirecting (or recycling) the "grey" water to flush waste into the black water tank uses or conserves fresh more efficiently. For example, where a conventional RV system uses fresh water to operate the toilet (creating black water), trailers in accordance with the present disclosure recycle the grey water and use it in the toilet. As such this water will have been used twice, first for whatever cleaning function it did and second for operating the toilet. The grey water may have soap or food residue, so a simple filter can be set up in line to remove the same before using the filtered grey water to flush the toilet.

Typical RV trailers use a folding step/stair system to enter the RV and because of space limitations (to store the folded unit), the steps are commonly fairly narrow. This can create a bit of a challenge when exiting the RV, especially if a user is carrying anything that obscures their vision looking down. Similarly, any small error in foot placement on a step system could result in a fall and this is especially true when the steps are wet.

Thus, in accordance with various additional aspects of the present disclosure, another novel feature of the trailers contemplated herein is a ramp door entry system. The benefit of the ramp door entry system instead of steps is ease of use and safety as a ramp entry/exit system does not require as precise a placement of your feet, as a step design. The ramp door can slide into a pocket built into the frame for storage and when the trailer is in transit.

In accordance with various additional aspects of the present disclosure and as noted above, trailers contemplated herein may be used for off-road and/or off-grid use. Such use requires the trailer to be as light as possible and be as immune to the elements as possible.

However, virtually every conventional RV design currently used incorporates traditional plywood into their construction. Plywood is a material is hydroscopic, meaning it can readily absorb moisture from the air, which creates many long-term problems in RV applications including delamination and warpage, which is made worse by the kind of thermal cycles that most RVs encounter. When used in floors, roofs or side walls, any delamination or warpage can destroy the integrity of the resulting system. Because the plywood absorbs water, when the trailer is exposed to large thermal cycles (hot or cold) the resulting expansion and contraction of the "wet" plywood causes the trailer to deteriorate from the inside out.

In contrast, trailers described herein feature a new waffle grid plastic based system referred to as a Waffle Grid Panel or WGP to alleviate the issues surrounding plywood. WGP are injection or compression molded from different polymers that are not hydroscopic and as a result, WGP are more dimensionally stable when exposed to thermal cycles. The "grid" portion of the design is a network of intersecting raised ribs that add stiffness to the panel. WGP are designed to be lighter than conventional plywood but have comparable stiffness. They can be used in any application that uses plywood, such as floors, roofs, side-walls, interior dividing walls, cabinets and the like. While the initial applications for these WGP are in the RV industry with ExoTek trailer design, it should be evident that the possible applications include anywhere that plywood is used and weight and/or dimensional stability are important.

In accordance with various aspects of the present disclosure, WGP may have tongue and groove type indexing that is incorporated into the sides of each panel to help maintain the panel-to-panel alignment and fit in multi-panel assemblies. Such indexing feature can be done many different ways. For example, a panel may use a bull-nose male-female design but any feature that helps align the top/bottom surfaces and provides some transverse shear capability to a panel connection should be covered by this application.

It should also be evident that all plastic materials, including recycled materials, may be used in the WGP system. This includes unreinforced polymers (e.g., ABS or polycarbonate) or fiber reinforced polymers as well, for applications that desire more stiffness and/or strength.

For applications that demand the highest stiffness possible, WGP can also incorporate an integral wire tensioning system on the grid side. The purpose of the tensioner system is to add a localized element to the panel that when the panel is loaded, is put in tension. In applications like flooring, where WGP are used as part of an overall system, tension wires can be incorporated into the WGP system to help stiffen the overall floor. In many cases, these tension wires are buried under flooring material that is used in conjunction with the WGP sub-floor.

Because the trailer design may be used for off-road/off-grid type use, it is likely to encounter inclement weather. High wind can be problematic for any lightweight trailer design. As such, a in accordance with various aspects of the present disclosure, an earth-anchor system designed to secure the trailer firmly to the ground. The earth-anchor system may include integral attachment points built into the frame and secondary anchors that screw into the ground. Ideally this is done at all four corners of the trailer, though as few as one anchor fall within the scope of the present disclosure. The earth-anchor system not only provides added safety and security during high-winds, anchoring the trailer to the ground also provides much better stability during normal everyday use. For example, a lightweight trailer can feel very unstable when moving around in it and having it secured directly to the ground will make it feel more solid.

As mentioned earlier, conventional trailers have wall and roof sections that are "pre-made" as large flat panels that then attach to the floor. These panels have foam built into the center of those panels and that creates an insulated wall or roof section.

However, because trailers as contemplated herein have a super-structure frame built first, the process of adding insulation is different and in this case, the process adds performance benefits as well. In this regard, in accordance with various additional aspects of the present disclosure, the trailer frame is covered with exterior panels, such as conventional fiberglass panels or WGP panels, including the side walls, roof, floors and even storage compartments. This may be done with adhesives, such as epoxy or 3M VHB tape.

Once the frame is "skinned" in this manner, it can be sprayed with conventional 2-part spray foams which function to seal the entire trailer from air and moisture penetration. But because these 2-part spray foams are closed-cell foams, which are more rigid that than the foam board used in conventional trailer walls/roofs, the resulting structure can be designed to be either stiffer (at the same overall thickness) or lighter (allowing the stiffer frame/foam design to make the wall/roof thinner).

In the case of WGP, the open grid design also helps provide a mechanical lock to the spray foam, resulting in an even stiffer/stronger wall/roof system. This new approach will help the trailer last longer and improve the performance and comfort for its occupants.

Finally, it will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of composition, ingredients, structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

What is claimed:

1. A trailer hitch frame for a truck and trailer, comprising:
   an overcab portion substantially parallel to a roof of the truck, wherein the overcab portion comprises:
   a roof connector located equidistant from either lateral side of the roof and aligned with a door pillar;
   a hitch; and
   wherein a front of the overcab portion comprises at least two horizontal portions culminating proximate the hitch;
   a forward frame portion extending from the overcab portion with a forward frame connector; and
   a rearward frame portion extending from the overcab portion with a rearward frame connector.

2. The trailer hitch frame of claim 1, further comprising at least one lateral support portion.

3. The trailer hitch frame of claim 2, wherein at least two forward frame portions extend from the at least one lateral support portion.

4. The trailer hitch frame of claim 1, wherein a rear portion of the overcab portion comprises at least two rearward frame portions.

5. The trailer hitch frame of claim 1, wherein the forward frame portion passes through a bed of the truck and connects to a frame of the truck and the rearward frame portion passes through the bed of the truck and connects to the frame, wherein the forward frame portion connects to the frame closer to a cab of the truck than the rearward frame portion.

6. The trailer hitch frame of claim 1, further comprising a roof support frame.

7. The trailer hitch frame of claim 1, wherein the hitch is a ball hitch.

8. The trailer hitch frame of claim 1, wherein the trailer hitch frame comprises tubular steel.

9. A trailer hitch system for coupling a sport utility vehicle and trailer, comprising a hitch and a hitch connector configured for attachment to a roll bar of the sport utility vehicle equidistant from either lateral side of a roof of the vehicle.

10. The trailer hitch system of claim 9, wherein the sport utility vehicle is a Jeep-style vehicle.

11. The trailer hitch system of claim 9, wherein the hitch is a ball hitch.

12. A trailer hitch frame for a truck and trailer, comprising:
an overcab portion substantially parallel to a roof of the truck, wherein the overcab portion comprises:
a roof support frame extending from one lateral side of the truck to the other and aligned with and connected to a door pillar;
a hitch connected to the roof support frame; and
a rearward frame portion extending from the overcab portion with a rearward frame connector.

13. The trailer hitch frame of claim 12, wherein a front of the overcab portion comprises at least two horizontal portions culminating proximate the hitch.

14. The trailer hitch frame of claim 12, wherein a rear portion of the overcab portion comprises at least two rearward frame portions.

15. The trailer hitch frame of claim 12, wherein the rearward frame portion passes through a bed of the truck and connects to a frame of the truck.

16. The trailer hitch frame of claim 12, wherein the hitch is a ball hitch.

17. The trailer hitch frame of claim 12, wherein the trailer hitch frame comprises tubular steel.

\* \* \* \* \*